United States Patent [19]

Francis et al.

[11] Patent Number: 5,179,046
[45] Date of Patent: Jan. 12, 1993

[54] SEALING MATERIAL AND METHOD

[75] Inventors: Gaylord L. Francis, Painted Post, N.Y.; Ronald E. Johnson, Tioga, Pa.

[73] Assignee: Corning Incorporated, Corning, N.Y.

[21] Appl. No.: 772,252

[22] Filed: Oct. 7, 1991

[51] Int. Cl.⁵ ............................................. C03C 8/24
[52] U.S. Cl. ............................................. 501/15; 501/19; 501/20; 501/44; 501/46
[58] Field of Search ......................... 501/14, 15, 17, 18, 501/19, 20, 44, 46

[56] References Cited

U.S. PATENT DOCUMENTS

| | | | |
|---|---|---|---|
| 4,150,995 | 4/1979 | Moritsu et al. | 501/22 |
| 4,172,733 | 10/1979 | Moritsu et al. | 501/20 |
| 4,238,704 | 12/1980 | Bonk et al. | 501/15 |
| 4,353,991 | 10/1982 | Van Ness et al. | 501/17 |
| 4,379,070 | 4/1983 | Tick | 501/13 |
| 4,436,955 | 3/1984 | Kyle | 501/15 |
| 4,532,222 | 7/1985 | Butt | 501/32 |
| 4,961,998 | 10/1990 | Senkalski et al. | 501/15 |

Primary Examiner—Mark L. Bell
Assistant Examiner—Chris Gallo
Attorney, Agent, or Firm—Milton M. Peterson; Clinton S. Janes, Jr.

[57] ABSTRACT

A fusion sealing material containing a mill addition, a sealing tape cast from the material, and a method of producing the tape. The material is composed of a low temperature glass, a mill addition that lowers the effective coefficient of thermal expansion of the glass in a seal and an organic medium. The sealing tape is prepared by hot mixing the solids with a liquefied medium, such as a high melting alcohol, and casting the hot mix onto a cold sheet to immediately solidify the medium.

29 Claims, No Drawings

1

SEALING MATERIAL AND METHOD

FIELD OF THE INVENTION

The field is a fusion sealing material containing a mill addition and preparation of such sealing material.

BACKGROUND OF THE INVENTION

U.S. Pat. No. 4,314,031 (Sanford et al.) discloses a family of tin-phosphorus oxyfluoride glasses. These glasses are low temperature glasses that characteristically melt at temperatures on the order of 400°-450° C. and exhibit very low Tg values. Generally, these values are under 200° C. and frequently below 100° C. In weight percent on an elemental basis, the Sanford et al. glasses are composed essentially of 20-85% Sn, 2-20% P, 3-20% O and 10-36% F, the total of the four elements being at least 75%. A number of optional constituents are disclosed, the principal one being up to 25% Pb.

The low Tg values of these glasses suggested their use for low temperature sealing purposes. However, the high coefficients of thermal expansion (CTE) exhibited by these glasses, generally on the order of $200 \times 10^{-7}$/°C., severely limited the areas of potential use. The solving of this problem is described in some detail in pending application Ser. No. 07/598,001, filed Oct. 9, 1990 by Cornelius et al. now U.S. Pat. No. 5,089,446, and assigned to the assignee of the subject application. The subject matter of that application is incorporated herein by reference.

As described in the Cornelius et al. application, the high CTE problem was attacked by both a glass composition study and a mill addition study. The glass composition study revealed that the incorporation of up to 11% niobium (Nb) in the base glass composition had the unique effect of substantially lowering the CTE value of the glass. Furthermore, this occurred without appreciable change in the Tg value. Further study showed that the unique effect of Nb could be further enhanced by additions of Mo, Fe, or V to the niobium glass.

At the same time, the mill addition approach revealed several additions that were compatible, that is, they remained inert in the glass, and decreased the effective CTE. These additives included Invar, molybdenum, tungsten, lead orthophosphate and a pyrophosphate containing one or more cations selected from Mg, Co, As, Zn, Al, Fe and Zr.

The pyrophosphates are of particular interest for at least two reasons. First, they can be obtained by crystallizing a glass of appropriate composition. Second, their effectiveness derives from large negative CTEs due to steep inversion temperatures. Each of the effective pyrophosphates has a different inversion temperature. This permits considerable flexibility in selecting, or combining, inversion points over the range of 50° to 350° C.

Attempts to put into practice the sealing materials of the Cornelius et al. application encountered problems. Differences in densities of the components led to separation and settling on standing. Further, the conventional binders of the art, nitrocellulose and methylcellulose, failed to burn off properly at low sealing temperatures.

It is then a basic purpose of our invention to provide solutions to these problems. Another purpose is to provide an improved sealing mixture that can be cast as a sealing tape, and the resulting improved sealing tape.

SUMMARY OF THE INVENTION

One aspect of the invention is a fusion sealing material composed essentially of a low temperature glass, a mill addition that lowers the effective CTE of the glass in a seal, and an organic medium that is a solid at room temperature, that melts at an elevated temperature and that boils below 350° C. In one embodiment, the glass is a member of the tin-phosphorus oxyfluoride glass family. That family may be composed essentially of 20-85% Sn, 2-20% P, 3-20% O and 10-30% F. Preferably, the glass also contains up to 25% Pb and/or up to 11% Nb. In another embodiment, the mill addition consists of one or more additives selected from Invar, molybdenum, tungsten, lead orthophosphate and a pyrophosphate having at least one cation selected from magnesium, cobalt, arsenic, zinc, iron, aluminum and zirconium. Preferably, the mill addition is a pyrophosphate selected from the group above in combination with Invar. A high melting alcohol, preferably hexadecanol or a mixture of alcohols, is the organic medium of choice.

Another aspect of our invention is a sealing tape composed of the fusion sealing mixture in a cast and solidified form. A further aspect is a method of preparing a sealing tape which comprises forming an intimate heated mixture of a low temperature sealing glass, a mill addition and an organic medium that is a solid at room temperature, that melts at an elevated temperature and boils below 350° C., casting the mixture while hot onto a cold surface, and cooling to solidify the sealing mixture.

PRIOR ART

Tape casting is a well-known ceramic procedure. A typical process is described, for example, in U.S. Pat. No. 4,917,934 (Sempolinski).

In addition to patents noted earlier, the Sempolinski patent, and patents cited therein, the following U.S. patents are cited as of interest:

U.S. Pat. No. 3,374,076 (Smith) discloses a method for making a glass to metal seal having precise dimensional requirements. The method involves grinding the glass to an ultrafine particle size, forming aggregates with a binder, pressing the aggregates and a metal member to form a compact of desired shape, and heating the compact to form a hermetic seal. There is no mention of using alcohols.

U.S. Pat. No. 3,489,579 (Steverding) discloses use of higher alcohols having 12-18 carbons in the primary carbon chain as surface-active agents in aqueous coolants to improve cooling effectiveness. This is not analogous to the present use in sealing materials.

GENERAL DESCRIPTION OF THE INVENTION

The present invention is directed at fusion sealing materials, such as described in pending application Ser. No. 07/598,001, and at their preparation. In particular, such materials embody a low temperature sealing glass, and one or more mill additions to modify sealing properties, such as coefficient of thermal expansion.

Frequently, a fusion sealing material must be prepared well in advance of use, and then maintained in a homogeneous state. Where the material is a mixture of components, there is a tendency for separation and settling to occur on standing in storage. This is particularly true when particulate materials are in suspension and there is a disparity in densities.

This situation prevails with the fusion sealing materials of the pending application Ser. No. 07/598,001. Those materials include not only a low temperature sealing glass, but also a mill addition, such as Invar and magnesium pyrophosphate. The disparities in densities among these components virtually preclude storing the fusion sealing materials as liquid dispersions.

Therefore, initial attempts at commercializing the sealing materials of the Cornelius et al. application were directed at forming a dispersion of the active ingredients in conventional solvents and binders to form a casting mixture. This mixture was then cast on a sheet in a thin layer and dried to form a sheet of material commonly termed a tape.

These attempts were unsuccessful. Because of differences in densities of the sealing mixture components, differential settling tended to occur during drying. For example, Invar, being denser, tended to settle to the bottom of a tape as the tape dried.

Another problem occurred when the cast tape was used. Conventional binders, such as methyl cellulose, did not burn off before the low temperature sealing glass softened. This, of course, precluded making a seal.

We have now found a fusion sealing material that can be cast without encountering the problem of settling in a casting. This material utilizes a high melting organic as the medium in which the solids are dispersed. These organics solidify quickly on cooling. This provides a solid casting that resists settling.

The term "high melting organic" includes organic media that are solid at room temperature, that melt to a liquid state at a higher temperature, but that vaporize, that is boil, at a temperature below the fusion sealing temperature, generally below 350° C. Among the organic materials that meet these conditions are primary alcohols with a primary carbon chain of 14-20 carbon atoms, corresponding fatty acids with a carbon chain of 10-18 carbon atoms and benzoate esters of polyols, such as, neopentyl glycol, triethylene glycol and glycerol. A preferred benzoate ester would be neopentyl glycol dibenzoate. Other low melting, organic waxes tend to have inferior firing properties and/or produce undesirable vapors. We consider the alcohols to provide the best mode of operation, and the invention is further described with reference thereto.

The term "high melting alcohols" is intended to include those alcohols that are solid at room temperature, but that liquefy and vaporize below the glass sealing temperature, generally below 350° C. This includes those primary alcohols that have a primary carbon chain of 14-20 atoms and mixture thereof.

A tape produced with a 14 carbon chain alcohol has a tendency to stick to packing material, while one produced with a 20 carbon chain member tends to be brittle. Either can be used in a mixture, and we generally prefer to use a blend or mixture of alcohols. Among the single alcohols, we prefer hexadecanol. Mixed alcohols, or blends, are available, for example, from Vista Chemical under the trademark ALFOL.

The new sealing material dispersion must be hot mixed at an elevated temperature. This temperature is at or above the temperature at which the higher alcohol becomes liquid, but below the temperature at which it vaporizes. For example, a preferred alcohol, hexadecanol, can be hot mixed with the solids to form a dispersion that can be cast at 150° C.

Initially, the solid components are reduced to powder form. The powders are then intimately dispersed in a thermally liquefied higher alcohol, or alcohol mixture.

The dispersion tends to become dilatant, that is, it becomes stiff and difficult to stir. We have found this can be overcome if the sealing glass is reduced to a powder passing a 325 mesh screen (0.044 mm opening). However, the glass powder should not be too fine, since, below about 500 mesh size (0.025 mm opening), it does not flow well in making a seal.

The hot dispersion thus prepared is thoroughly mixed while being kept hot to keep the alcohol liquified. It is then poured into a heated doctor blade for casting. The dispersion is cast hot onto a thin, flexible, cold sheet, for example, a MYLAR sheet. There, it solidifies immediately. To facilitate release of the solidified tape, a silicone release coating may be applied to the MYLAR sheet.

The glass used in the sealing material may be any low temperature glass, that is, a glass having a transition temperature below about 250° C. We prefer, however, to employ one of the tin-phosphorus oxyfluoride glasses disclosed in U.S. Pat. No. 4,314,031 (Sanford et al.)., or one of the modified compositions of pending application Ser. No. 07/598,001. The latter characteristically are composed essentially of 20-85% Sn, 2-20% P, 3-20% O, 10-36% F and up to 11% niobium. Optionally, it is desirable to have up to 25% Pb and/or up to 10% of one or more of Mo, Fe, or V in the glass.

The mill addition may be any one or more of those materials disclosed in the pending application noted earlier. These include Invar, molybdenum, tungsten, lead orthophosphate, a pyrophosphate having one or more cations selected from the group composed of Mg, Co, As, Zn, Fe, Al and Zr, and one or more oxides selected from the oxides of lead, bismuth, antimony, zinc, cadmium, and stannous tin. The latter group of oxides, particularly stannous tin, tend to avoid bubble formation during formation of a seal. We prefer to employ a pyrophosphate for reduction of coefficient of thermal expansion. The pyrophosphate is preferably used with up to 40% Invar to reduce cracking in a seal, and with up to 15% SnO to avoid bubbles forming in a seal.

Some applications permit employing a sealing material directly, that is, without shipping and/or storage. In that situation, it may be preferable to employ a direct application of the sealing material, such as by screening. We have found this may be done, provided adequate care is taken.

A dispersion in a higher alcohol will be prepared by hot mixing as described above for casting. Rather than being cast, however, the hot dispersion is, for example, poured onto a heated screen placed over a sealing surface. The sealing surface may be cold so that the alcohol solidifies on contact with the surface. In such a procedure, care must be taken to have the screen adequately heated to maintain the dispersion hot during the application to and through the screen.

SPECIFIC EMBODIMENTS

The invention is further described with reference to sealing tape compositions suitable for use in three different sealing applications:

EXAMPLE I

The following composition is particularly adapted to forming a seal with a soda lime silicate glass having a coefficient of thermal expansion (CTE) of about $90 \times 10^{-7}/°C$. (25°–300° C.). All solids are reduced to powder form before mixing, the glass passing through a 325 mesh (0.044 mm opening) screen.

| Glass | 50 gms |
|---|---|
| Invar | 15 gms |
| SnO | 5 gms |
| Pyrophosphate | 2 gms |
| Hexadecanol | 12.2 gms |

The glass is a low temperature glass having a transition temperature (Tg) of 198° C., a sealing temperature (Tx) of 300° C. and a CTE of 125° C. The glass composition is as follows in weight % as calculated from the batch:

| $SnF_2$ | 26.8 |
|---|---|
| SnO | 25.2 |
| $PbF_2$ | 2.0 |
| $P_2O_5$ | 33.0 |
| $ZnF_2$ | 2.0 |
| $Nb_2O_5$ | 9.0 |
| $BaF_2$ | 2.0 |

The pyrophosphate is a mixed magnesium and cobalt pyrophosphate corresponding to the approximate formula $MgCoP_2O_7$. It has an inversion temperature of about 160° C., and was prepared by crystallizing a glass having the following composition in weight % on an oxide basis:

| MgO | 16 |
|---|---|
| $Co_3O_4$ | 29.5 |
| $P_2O_5$ | 54.5 |

The solids, in powder form, are stirred into hexadecanol which is maintained as a liquid at about 150° C. The dispersion, thus formed, is poured hot into a heated doctor blade and cast onto a cold MYLAR sheet having a silicone release coating. The sheet of sealing material, thus formed, can be cut to appropriate sizes and shapes for sealing purposes. When placed on a soda lime silicate glass surface and heated to a temperature of about 350° C., the hexadecanol vaporizes, and the solids soften and wet the glass to form a seal.

EXAMPLE II

The same materials are mixed in a different proportion to produce a sealing tape adapted to use with an alumina ceramic. The ceramic has a CTE of about $65 \times 10^{-7}/°C$. which the sealing tape composition is adapted to match. The tape composition is:

| Glass | 50 gms |
|---|---|
| Invar | 25 gms |
| SnO | 2 gms |
| Pyrophosphate | 2 gms |
| Hexadecanol | 13 gms |

The procedure described in Example I is followed both in preparing the sealing tape and in its application. The single exception is that the tape is applied to an alumina ceramic surface and a seal formed therewith.

EXAMPLE III

The procedure described above may be used to make seals with still lower CTE materials, such as borosilicate glasses, high silica glasses and glass-ceramics. The CTE of the sealing tape may be adjusted by employing a combination of magnesium and cobalt pyrophosphates with the ratio being varied to vary the inversion temperatures. The manner in which this is accomplished is described in detail in pending application Ser. No. 07/598,001 noted earlier. The teaching of that application is incorporated herein by reference.

We claim:

1. A fusion sealing material consisting essentially of a low temperature glass, a mill addition that lowers the effective coefficient of thermal expansion of the glass in a seal and a high melting organic medium that is a solid at room temperature, that melts at an elevated temperature and that boils below 350° C., and that is selected from the group consisting of primary alcohols with a primary carbon chain of 14–20 carbon atoms, corresponding fatty acids with a carbon chain of 10–18 carbon atoms, benzoate esters of polyols and mixtures.

2. A fusion sealing material in accordance with claim 1 wherein the low temperature glass is a tin-phosphorus oxyfluoride glass.

3. A fusion sealing material in accordance with claim 2 wherein the glass consists essentially, in calculated weight %, of 20–85% Sn, 2–20% P, 3–20% O, 10–30% F and up to 11% Nb.

4. A fusion sealing material in accordance with claim 3 wherein the glass additionally contains up to 10% of one or more of the group consisting of Mo, Fe and V and up to 25% Pb.

5. A fusion sealing material in accordance with claim 1 wherein the mill addition is at least one member selected from the group consisting of Invar, molybdenum, tungsten, lead orthophosphate and a pyrophosphate having at least one cation selected from the group consisting of magnesium, cobalt, arsenic, zinc, iron, aluminum and zirconium.

6. A fusion sealing material in accordance with claim 5 wherein the mill addition is a pyrophosphate having at least one cation selected from the group consisting of magnesium, cobalt, arsenic, zinc, iron, aluminum and zirconium.

7. A fusion sealing material in accordance with claim 6 wherein the selected cation is magnesium and/or cobalt.

8. A fusion sealing material in accordance with claim 6 wherein the pyrophosphate is a crystallized glass.

9. A fusion sealing material in accordance with claim 6 wherein the mill addition further includes Invar.

10. A fusion sealing material in accordance with claim 1 wherein the fusion sealing material includes SnO.

11. A fusion sealing material in accordance with claim 1 wherein the organic medium is a high melting alcohol.

12. A fusion sealing material in accordance with claim 1 wherein the high melting organic medium is selected from the group of primary alcohols with a primary chain of 14 to 20 carbon atoms and mixtures of such alcohols.

13. A fusion sealing material in accordance with claim 12 wherein the selected alcohol is hexadecanol.

14. A sealing tape consisting essentially of a low temperature glass, a mill addition that lowers the effective coefficient of thermal expansion of the glass in a seal and a high melting organic medium that is a solid at room temperature, that melts at an elevated temperature, that boils below 350° C. and that is selected from the group consisting of primary alcohols with a primary carbon chain of 14-20 carbon atoms, corresponding fatty acids with a carbon chain of 10-18 carbon atoms, benzoate esters of polyols and mixtures.

15. A sealing tape in accordance with claim 14 wherein the low temperature glass is a tin-phosphorus oxyfluoride glass.

16. A sealing tape in accordance with claim 15 wherein the glass consists essentially in calculated weight % of 20-85% Sn, 2-20% P, 3-20% O, 10-30% F, up to 11% Nb, 0-10% of one or more of the group consisting of Mo, Fe and V and 0-25% Pb.

17. A sealing tape in accordance with claim 14 wherein the mill addition is at least one member selected from the group consisting of Invar, molybdenum, tungsten, lead orthophosphate and a pyrophosphate having at least one cation selected from the group consisting of magnesium, cobalt, arsenic, zinc, iron, aluminum and zirconium.

18. A sealing tape in accordance with claim 17 wherein the mill addition is a pyrophosphate having at least one cation selected from the group consisting of magnesium and/or cobalt.

19. A sealing tape in accordance with claim 17 wherein the mill addition includes both a pyrophosphate and Invar.

20. A sealing tape in accordance with claim 14 wherein the organic medium is a high melting alcohol.

21. A sealing tape in accordance with claim 14 wherein the high melting organic medium is selected from the group of primary alcohols with a primary chain of 14 to 20 carbon atoms and mixtures of such alcohols.

22. A sealing tape in accordance with claim 21 wherein the selected alcohol is hexadecanol.

23. A method of preparing a sealing tape consisting essentially of a low temperature glass, a mill addition that lowers the effective coefficient of thermal expansion of the glass in a seal and a medium, the method comprising selecting as a medium a high melting organic medium that is a solid at room temperature, that melts at an elevated temperature and that boils below 350° C., and that is selected from the group consisting of primary alcohols with a primary carbon chain of 14-20 carbon atoms, corresponding fatty acids with a carbon chain of 10-18 carbon atoms, benzoate esters of polyols and mixtures, reducing the solids to powder form, thermally liquefying the organic medium, hot mixing the powdered solids in the liquid organic medium to form a dispersion and casting the dispersion while hot onto a cold surface to immediately solidify the organic medium.

24. A method in accordance with claim 23 wherein the selected medium is a high melting alcohol.

25. A method in accordance with claim 23 wherein the high melting organic medium is selected from the group of primary alcohols with a primary chain of 14 to 20 carbon atoms and mixtures of such alcohols.

26. A method in accordance with claim 24 wherein the glass powder is between 325 and 500 mesh size.

27. A method in accordance with claim 24 wherein the hot mixing is at a temperature of about 150° C.

28. A method in accordance with claim 24 wherein the dispersion is cast from a heated doctor blade.

29. A method in accordance with claim 24 wherein the dispersion is cast upon the surface of a cold, thin, flexible sheet.

* * * * *